(12) United States Patent  (10) Patent No.: US 9,209,611 B2
Gagne et al.  (45) Date of Patent: Dec. 8, 2015

(54) FLANGE AND SLEEVE ASSEMBLY

(71) Applicant: Brainwave Research Corporation, Woodbridge (CA)

(72) Inventors: Jean-Guy Gagne, Etobicoke (CA); James W. Rodgers, Toronto (CA)

(73) Assignee: BRAINWAVE RESEARCH CORPORATION, Ontario (CA)

( * ) Notice: Subject to any disclaimer, the term of this patent is extended or adjusted under 35 U.S.C. 154(b) by 261 days.

(21) Appl. No.: 13/795,538

(22) Filed: Mar. 12, 2013

(65) Prior Publication Data

US 2013/0235547 A1 Sep. 12, 2013

Related U.S. Application Data

(60) Provisional application No. 61/609,663, filed on Mar. 12, 2012.

(51) Int. Cl.
H05K 7/02 (2006.01)
H05K 7/04 (2006.01)
H02G 3/12 (2006.01)
H02G 3/14 (2006.01)

(52) U.S. Cl.
CPC . *H02G 3/12* (2013.01); *H02G 3/14* (2013.01); *Y10T 403/64* (2015.01)

(58) Field of Classification Search
USPC ............ 361/801–802, 807, 809–810; 174/57, 174/53, 66, 100
See application file for complete search history.

(56) References Cited

U.S. PATENT DOCUMENTS

| 5,064,386 A * | 11/1991 | Dale et al. | 439/535 |
| 5,828,002 A * | 10/1998 | Fedun | 174/58 |
| 8,013,243 B2 * | 9/2011 | Korcz et al. | 174/57 |
| 8,575,497 B2 * | 11/2013 | Hultgreen | 174/502 |
| 8,658,894 B1 * | 2/2014 | Witherbee | 174/58 |
| 8,835,764 B2 * | 9/2014 | Seff et al. | 174/67 |
| 2010/0084155 A1 * | 4/2010 | Jafari | 174/58 |

* cited by examiner

*Primary Examiner* — Hung S Bui
(74) *Attorney, Agent, or Firm* — Ditthavong & Steiner, P.C.

(57) ABSTRACT

An assembly includes a flange that can be fixed to an interior wall structure, such as an electrical box. A planar surface of the flange abuts the outer surface of the wall substrate thus providing tight contact between the wall substrate and the interior structure. Mating elements of the flange engage an electrical device to maintain the device in flush and parallel alignment with the substrate.

7 Claims, 25 Drawing Sheets

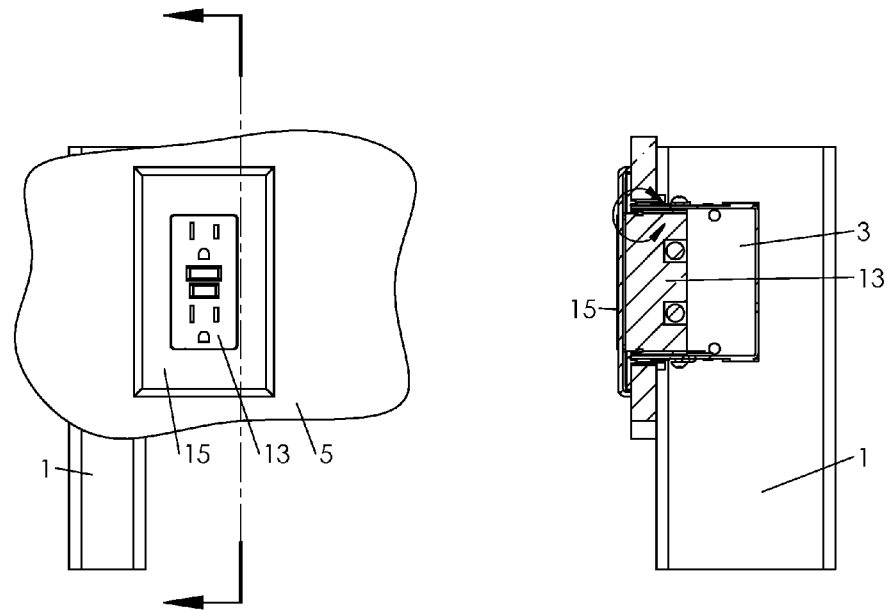
FIG. 4c
FIG. 4d
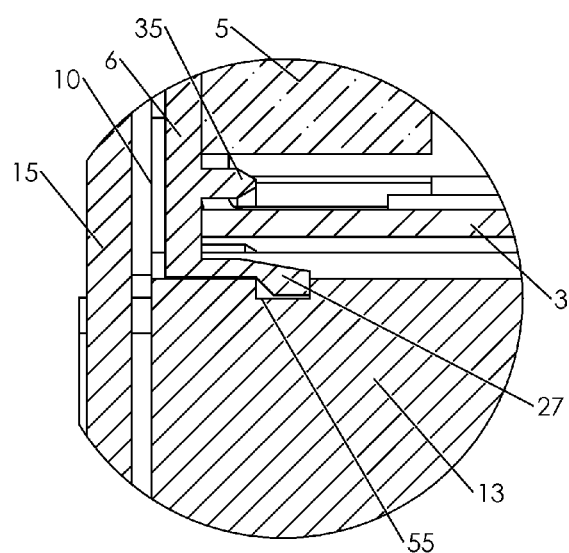
FIG. 4e

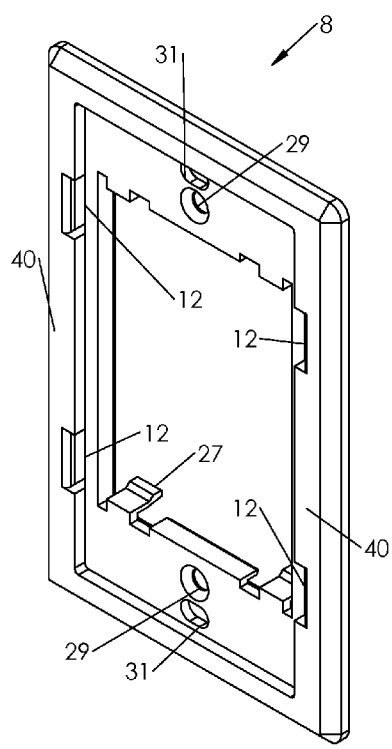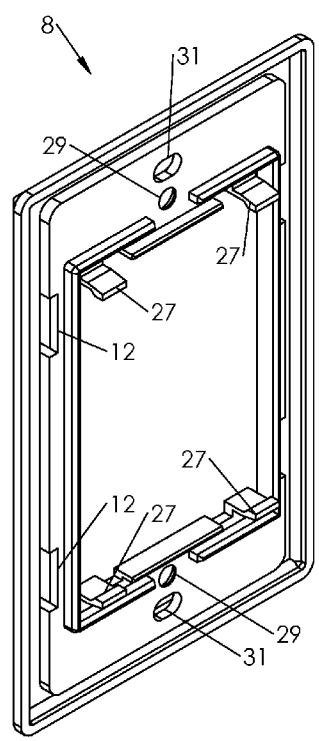
FIG. 10c
FIG. 10d

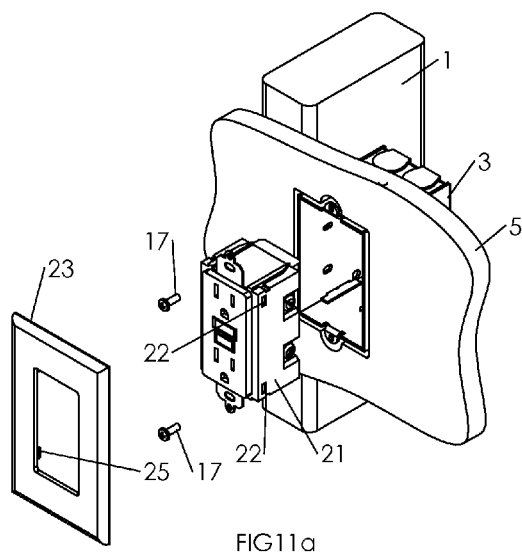
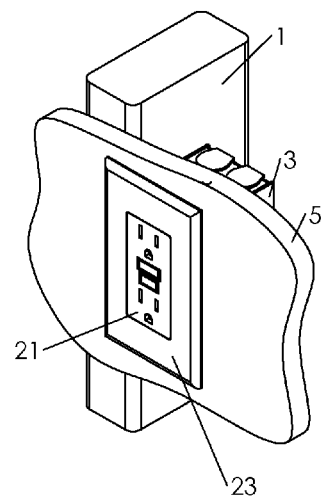
FIG11a
FIG11b
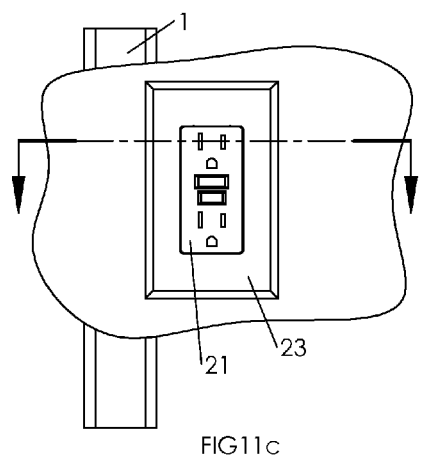
FIG11c
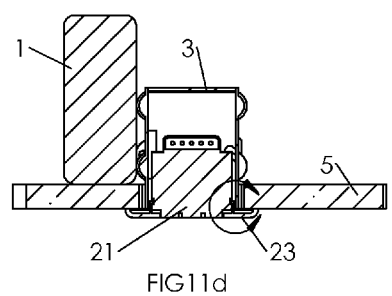
FIG11d
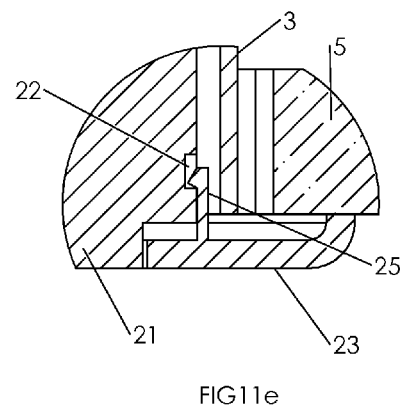
FIG11e

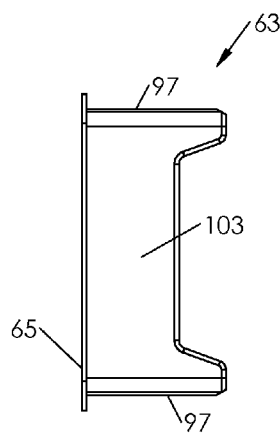
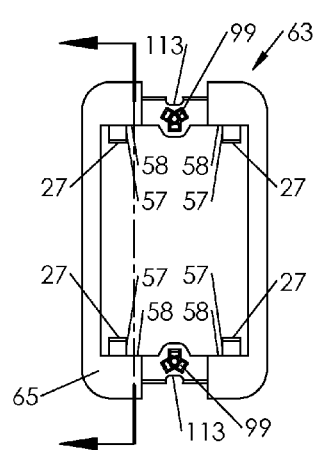
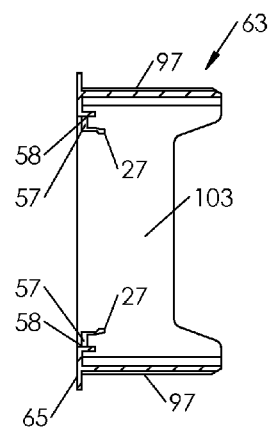
FIG. 13a          FIG. 13b          FIG. 13c
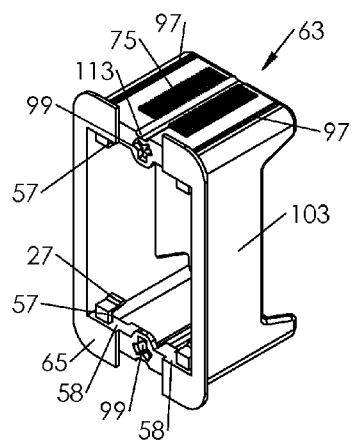
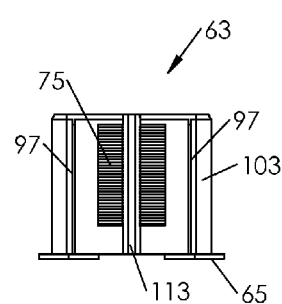
FIG. 13d          FIG. 13e

FLANGE AND SLEEVE ASSEMBLY

The benefit of provisional application 61/609,663, filed Mar. 12, 2012 on behalf of inventors Jean-Guy Gagne and James Rogers, is claimed under 35 U.S.C. 119(e). The present disclosure contains subject matter related to co-pending application Ser. No. 13/745,034, entitled ELECTRICAL BOX AND SLEEVE, filed by the current inventors on Jan. 18, 2013.

BACKGROUND

This disclosure is related to installation of electrical components in building walls, more particularly, to installation of support structure for line voltage and low voltage devices and the like. Existing electrical codes require containment of electrical switches and receptacles within electrical boxes. In new house or building construction, line voltage electrical boxes typically are attached to wall studs or joists before drywall or equivalent sheet material is applied to enclose the wall space. An opening is cut in the sheet material to accommodate the box or boxes that have been mounted in known positions. According to code, the enclosure of a line voltage electrical device must be in continuity with the wall substrate. Although low voltage applications, such as network communications, need not meet line voltage box requirements, means must be provided in the wall to provide appropriate access to internal wiring.

As the wall substrate, such as drywall, is fixed to the wall stud structure before installation of an electrical device can be completed, needs exist for efficiently locating and creating an opening in the substrate and for engaging the device in its enclosure. Cutting an opening in the wall substrate that is appropriately sized and placed can be time consuming. Difficulties exist in accurately locating a template to meet this need.

Conventionally, an electrical box is mounted to the wall stud so that the outer edge of the box is flush with the outer surface of the wall substrate, thereby meeting the code requirement for continuity. The installer must accurately locate the position of the box based on the wall substrate thickness. As various wall substrate thicknesses are in common use, a mounted box may need to be removed and repositioned if the substrate thickness is not compatible. As the outer edge of the box may not be square with the wall substrate, means should be provided to ensure that the facing of the mounted electrical device is flush with the plane of the substrate.

The conventional procedures for installation of electrical boxes and formation of substrate openings, therefore, involve a considerable expenditure of time and effort. Needs exist for a more accurate and easier way to facilitate installation of electrical devices in building walls, both in the formation of the substrate opening and in the provision of support for the electrical devices. Improvement is needed for an installation in which the electrical device is parallel to the front face of the wall substrate.

SUMMARY OF DISCLOSURE

The needs described above are fulfilled, at least in part, by an assembly including a flange that can be coupled to an interior wall structure, such as an electrical box. A planar surface of the flange abuts the outer surface of the wall substrate thus providing tight contact between the wall substrate and the interior structure.

Mating elements of the flange engage an electrical device to maintain the device in flush and parallel alignment with the substrate. Flexible tabs may extend from an inner opening periphery of the flange to couple with corresponding recesses in a housing of the electrical device. Cutout portions of the inner periphery mate with ribs on an outer surface of the housing to provide alignment between the flange and the device during insertion thereof.

The recesses are formed on the outer surface of the device housing at locations interior of a front facing housing surface. A plurality of channels extend from the front facing surface to the recesses, thereby facilitating easy removal of the electrical device from the flange.

The outer perimeter of the flange may be configured with a beveled edge. The flange may comprise slots for receiving elements of a cover plate for the electrical device. The flange may be configured to accommodate a plurality of electrical devices including, for example, devices configured for line voltage applications and as well as for low voltage communication devices.

An additional assembly embodiment may include a removable sleeve that is engageable with a flange directly fixed to an electrical box or the like. The flange is configured as a template guide for cutting the wall substrate opening. The sleeve contains an outer longitudinal surface with a plurality of teeth spaced along its extent. A plurality of retainers extend from an inner opening periphery of the flange for engaging the teeth of the sleeve. Retainers extend from an inner longitudinal surface of the sleeve to mate with recesses in the electrical device when inserted in the sleeve.

When inserted through an opening in a wall substrate and engaged with the flange, the sleeve secures tight contact between the wall substrate and the electrical box, irrespective of the thickness of the wall substrate. The electrical device can be inserted through the wall substrate opening for coupling with the sleeve.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1b is a perspective view of the assembled installation shown in FIG. 1a;

FIG. 2b is a front view of the embodiment shown in FIGS. 1b and 2a;

FIGS. 3a-3e are various detail views of the flange element of FIG. 1a;

FIG. 4a is a perspective exploded view of a modification of the installation assembly shown in FIG. 1a;

FIG. 4b is a perspective view of the assembled installation shown in FIG. 4a;

FIG. 4c is a front view of the installation shown in FIG. 4b;

FIG. 4d is a section view taken from FIG. 4c;

FIG. 4e is an enlarged view of a portion of FIG. 4d;

FIGS. 5a-5d are various views of the electrical device shown in FIG. 4a;

FIGS. 6a-6b are views of the cover plate shown in FIG. 4a;

FIGS. 10c-10d are perspective detail views of the flange of FIGS. 10a-10b;

FIGS. 11a-11b are perspective views of an alternative embodiment to the one shown in FIGS. 4a-4b;

FIG. 11c is a front view of the embodiment of FIGS. 11a-11b;

FIG. 11d is a section view taken from FIG. 11c;

FIG. 11e is an enlarged detail view of a portion of FIG. 11d;

FIGS. 13a-13e are various detail views of the sleeve of FIG. 12a;

FIG. 17b is a front view of the installation shown in FIG. 17a;

DETAILED DISCLOSURE

Figure 1A:
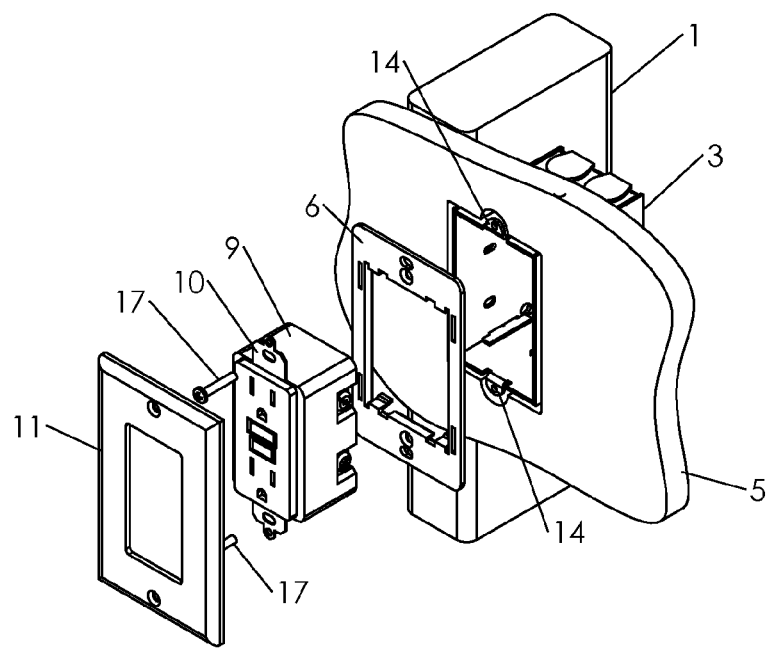
FIG. 1a is an exploded perspective view of a preferred embodiment of an installation assembly.
Figure 1B:
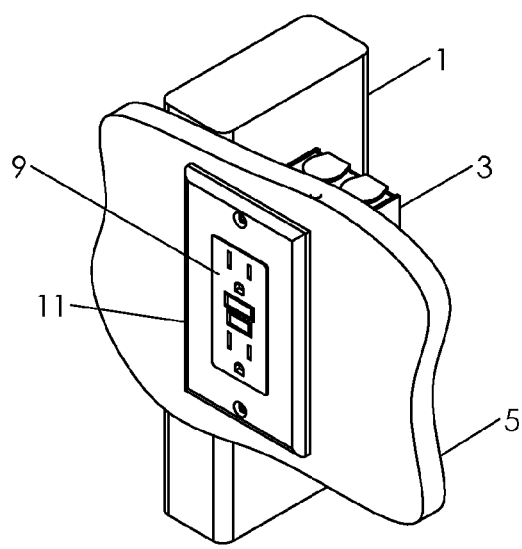

A preferred embodiment of an installation assembly is shown in FIGS. 1a and 1b. Electrical box 3 may be mounted in conventional manner on wall stud 1 behind wall substrate 5. Flange 6 is sandwiched between mounting plates 10 of conventional electrical device 9, illustrated herein as an outlet. It should be understood that the assembly is applicable for use with other electrical devices, such as switches and the like. Fasteners 17, threaded into holes on tab 14 of box 3, hold both device 9 and flange 6 in place. Flange 6 is flush with the outer surface of wall substrate 5. Flange 6 may be fabricated of injection molded plastic or metal. Cover plate 11 may be mounted with threaded fasteners, not shown, on device 9 in conventional manner.

Figure 2A:
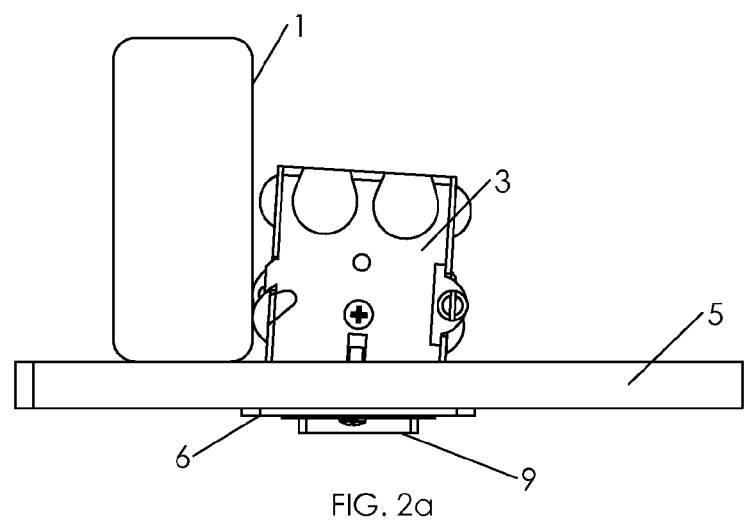
FIG. 2a is a top plan view of the assembled installation shown in FIG. 1a, applied to an electrical box mounted askew on a stud.
Figure 2B:
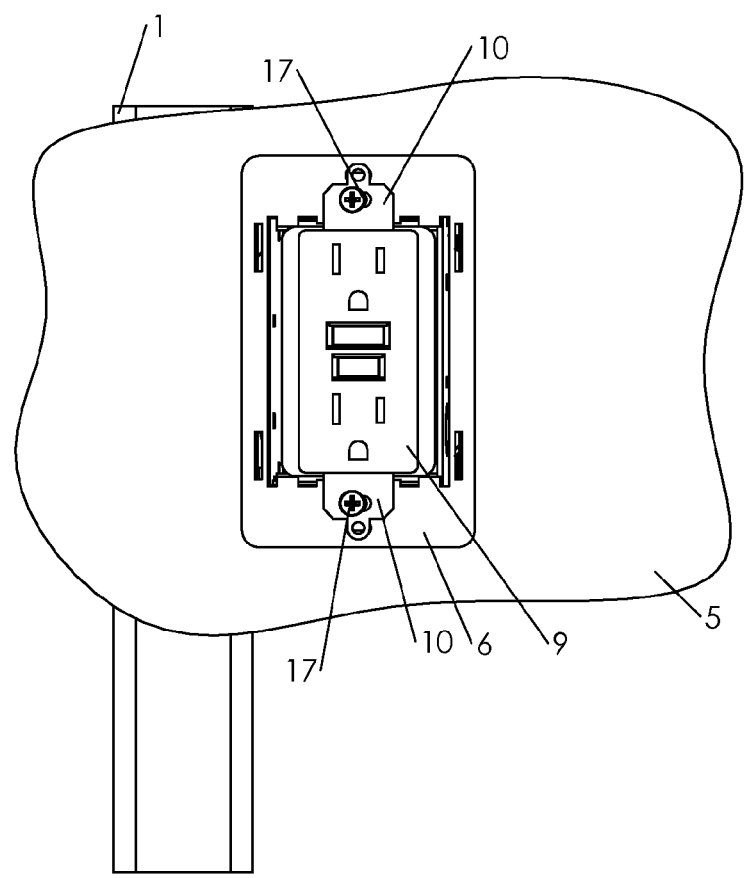
Figure 3A:
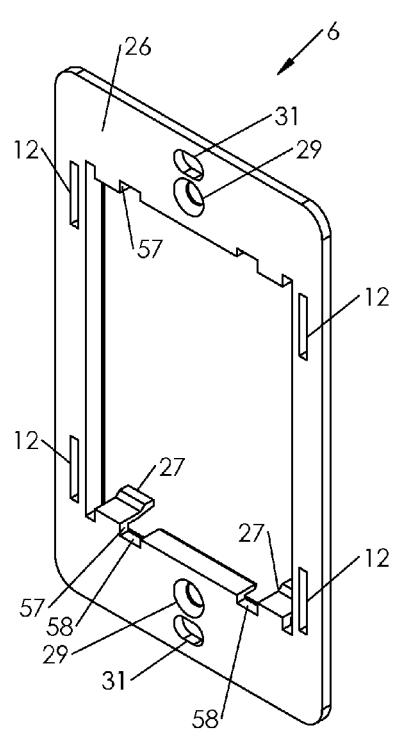
Figure 3B:
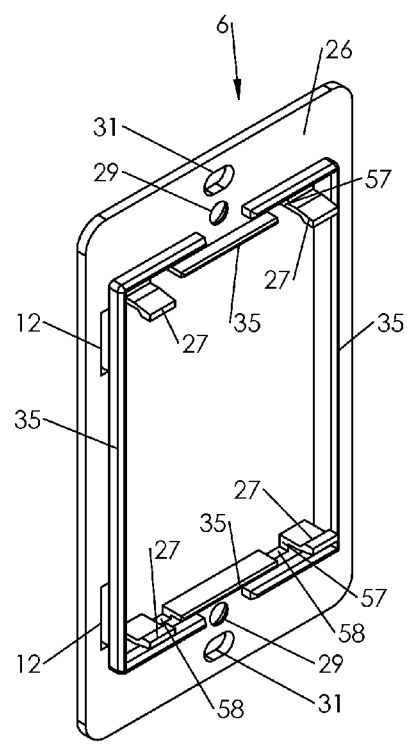
Figure 3C:
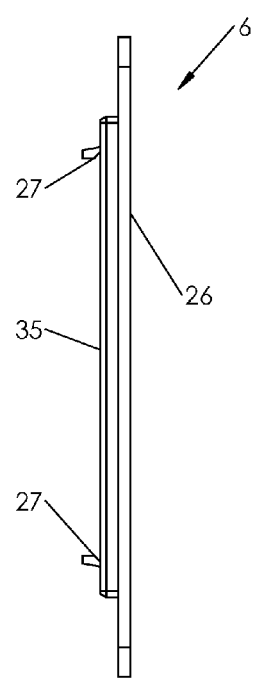
Figure 3D:
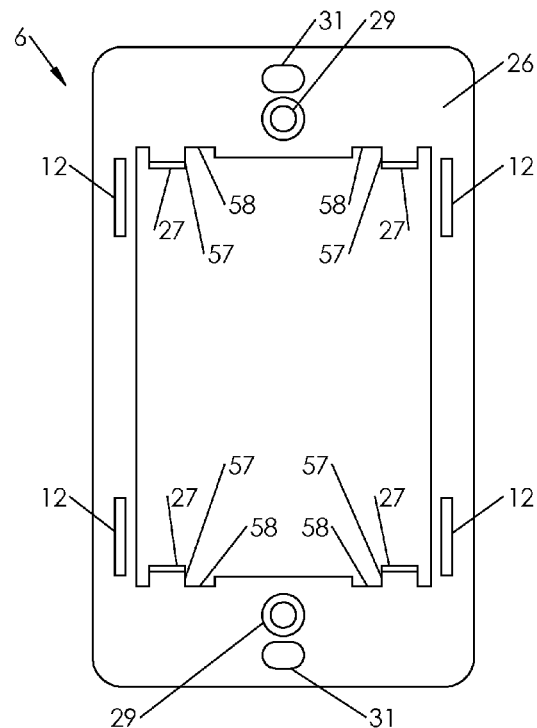
Figure 3E:
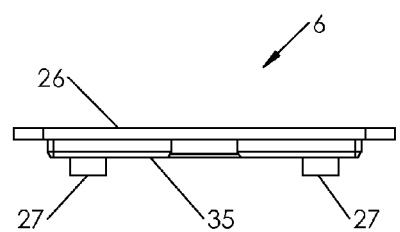

Flange 6 thus ensures that the front surface of device 9 can be mounted parallel to drywall 5 even if box 3 is not. In the latter instance, as illustrated in FIGS. 2a and 2b, electrical box 3 is mounted askew with respect to stud 1 and wall substrate 5. Flange 6 rests flush against drywall 5 allowing the front face of device 9 to be mounted parallel to the outer surface of drywall 5. The presence of flange 6 device avoids the likelihood that mounting plates 10 would dig into wall substrate 5 and skew device 9, as would occur during conventional installation.

Figure 6A:
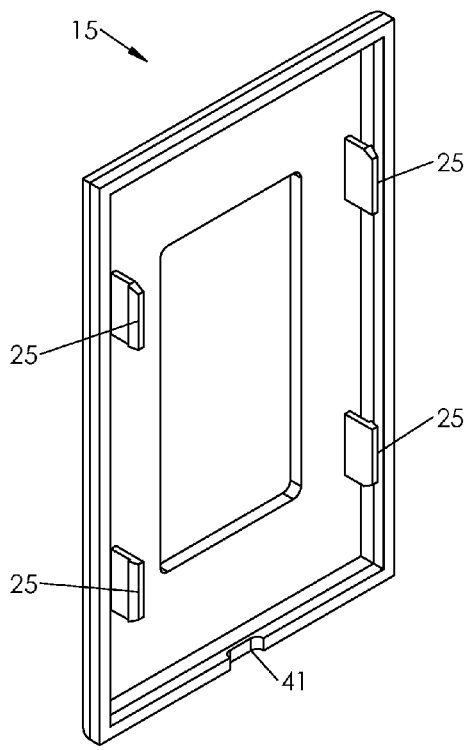
Figure 6B:
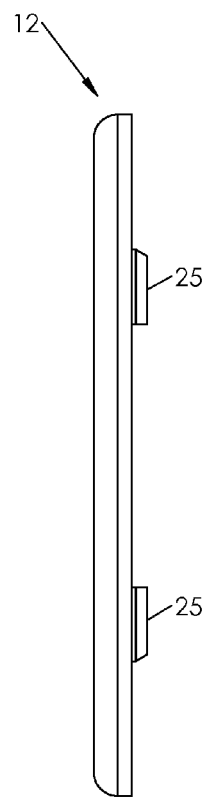

FIGS. 3a-3e are detailed views of flange 6 of FIG. 1a. Flange 26 contains mounting holes 29 for attachment to the electrical box. Flange 26 can accommodate screw attachment to a cover plate 11, shown in FIG. 1a via clearance holes 31. Cover plate retainer holes 12 are provided to accommodate a snap-on cover plate 15, shown in FIGS. 6a and 6b, in lieu of cover plate 11. Sprung retainers 27 extend inwardly from the inner opening periphery at the upper and lower corners thereof. Ribs 35 give added strength to flange 26, reducing tendency of deformation when installed.

Centering cutout portions 57 and 58 allow snap-in device 13, shown in the modified embodiment of FIGS. 4a-4e, to be centered in the opening. In this installation, the hole in drywall 5 may be cut around the outside perimeter of electrical box 3 in conventional manner. Flange 6 is fastened to box 3 with threaded fasteners 17 through mounting holes 29 into holes on tab 14 of the box. Snap-in electrical device 13, illustrated as an outlet, may then be pushed into flange 6.

Electrical device 13 is illustrated in FIGS. 5a-5d. Recesses 55 are located proximate the four corners of the device housing in the top and bottom surfaces thereof. The recesses extend inwardly from the front surface of the housing. Centering ribs 51 on the top and bottom surfaces allow device 13 to be centered and solidly retained horizontally and vertically. Chamfer 53 on the end of each rib 51 allows easy installation between the matching cutout portions of flange 6.

Referring to FIGS. 4a-4e, as device 13 is inserted, side and top surfaces of ribs 51 on device 13 run along horizontal centering surfaces 57 and vertical centering surfaces 58 respectively. When mounting flange 10 of the device reaches flange 6, four sprung retainers 27 drop into device recesses 55 to secure the device in place. Removal of the device may be accomplished by flexing retainers 27 out of recesses 55. Retainers 27 are accessed from either side of device 13 for removal. Flexible barbed retainers 25 of snap-on cover plate 15 pass through holes 12 in flange 6 and retain on the backside thereof. Removal of the cover plate 15 can be done by inserting a screw driver or the like in recess 41 to pry off cover plate 15. Engagement of the device with the flange and cover plate may best be seen in the partial detail view of FIG. 4e.

Figure 7A:
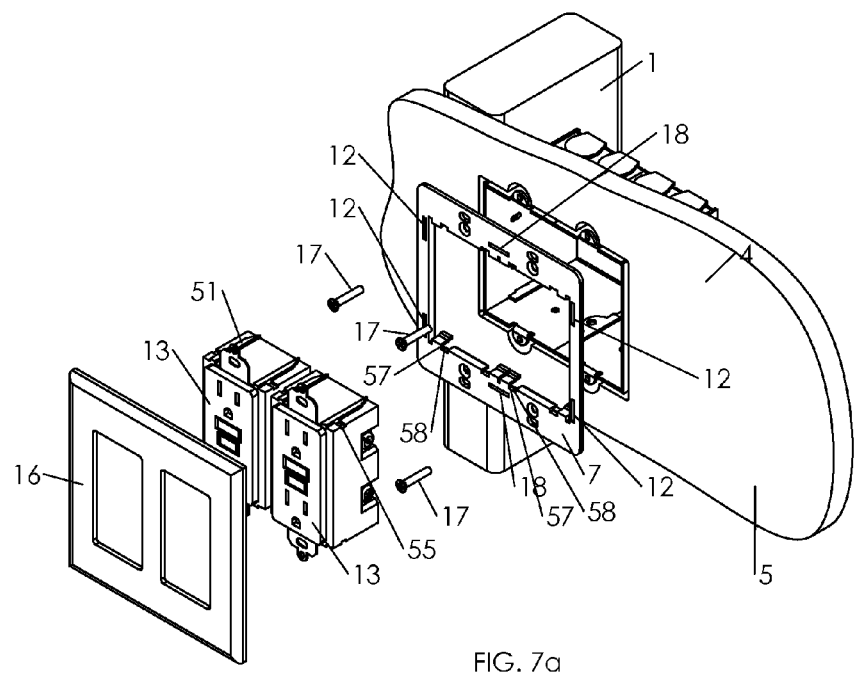
FIGS. 7a-7b are exploded and assembled perspective views, respectively, of a two gang installation of the embodiment shown in FIGS. 4a-4b.
Figure 7B:
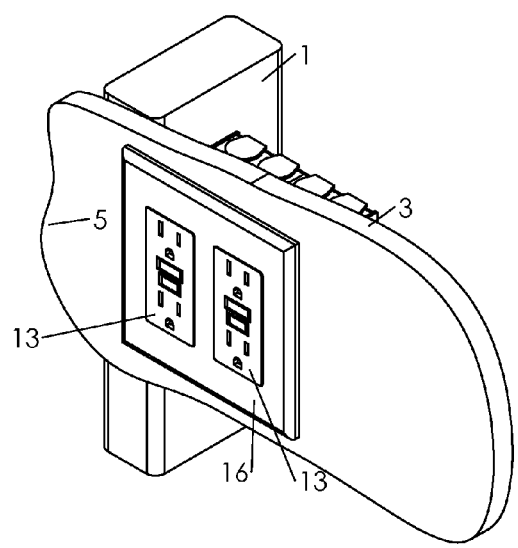
Figure 8A:
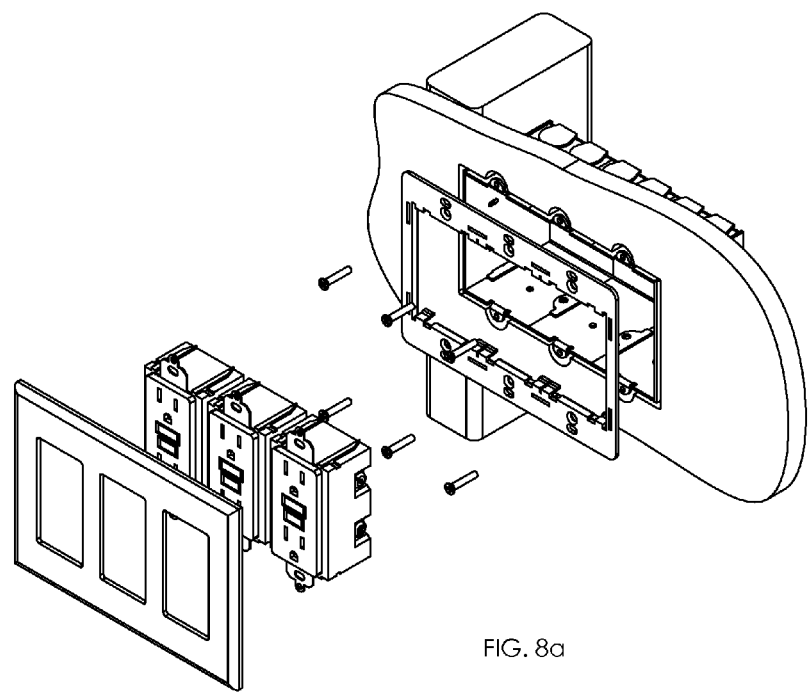
FIGS. 8a-b are exploded and assembled perspective views, respectively, of a three gang installation of the embodiment shown in FIGS. 4a-b.
Figure 8B:
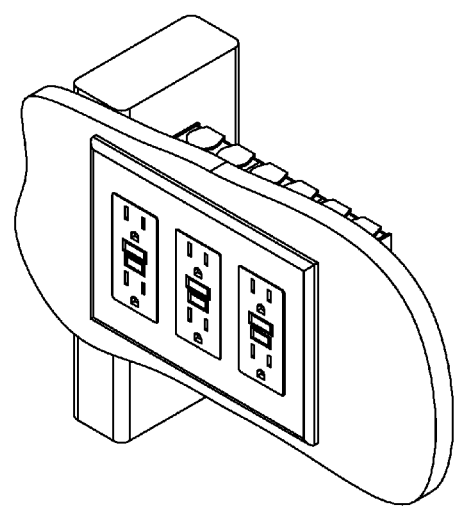
Figure 9A:
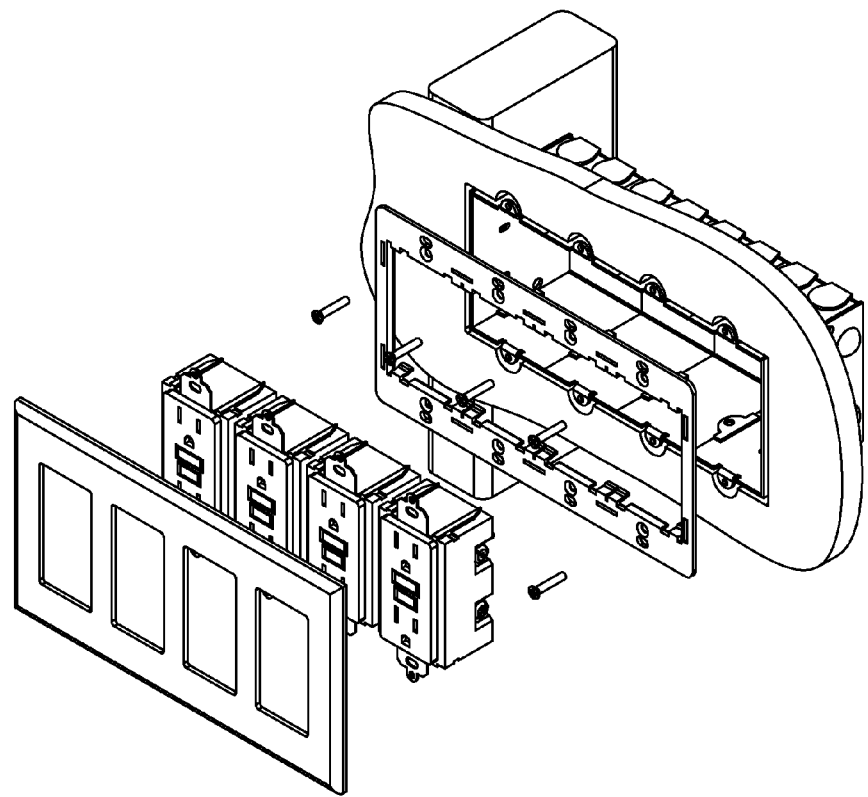
FIGS. 9a-9b are exploded and assembled perspective views, respectively, of a four gang installation of the embodiment shown in FIGS. 4a-4b.
Figure 9B:
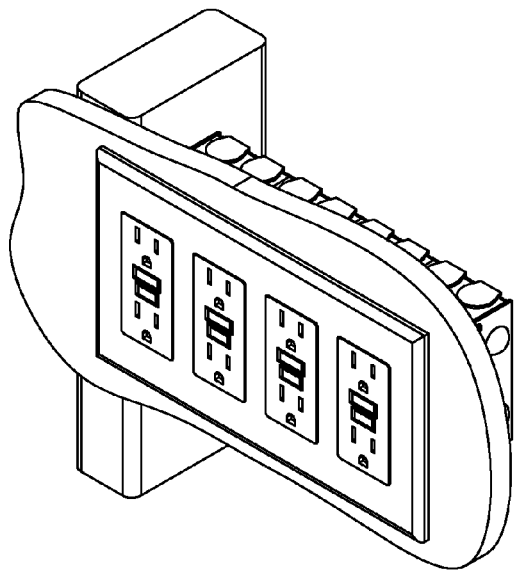

FIGS. 7a-7b illustrate the embodiment of FIGS. 4a-4e, for use in accommodating a two gang installation. Two gang flange 7 is installed via fasteners 17 on two gang electrical box 4. Electrical devices 13 are snapped-in to flush flange 7. Two gang cover plate 16 is snapped on to flush flange 7 via side holes 12 and mid span holes 18. Device centering ribs 51 and flush flange horizontal centering surfaces 57 allow cover plate 16 to be installed without horizontal adjustment of the devices, as would be required in conventional installations. This feature is a benefit to all multigang installations. Similar installations are shown in three and four gang configurations in FIGS. 8a-8b and 9a-9b, respectively.

Figure 4A:
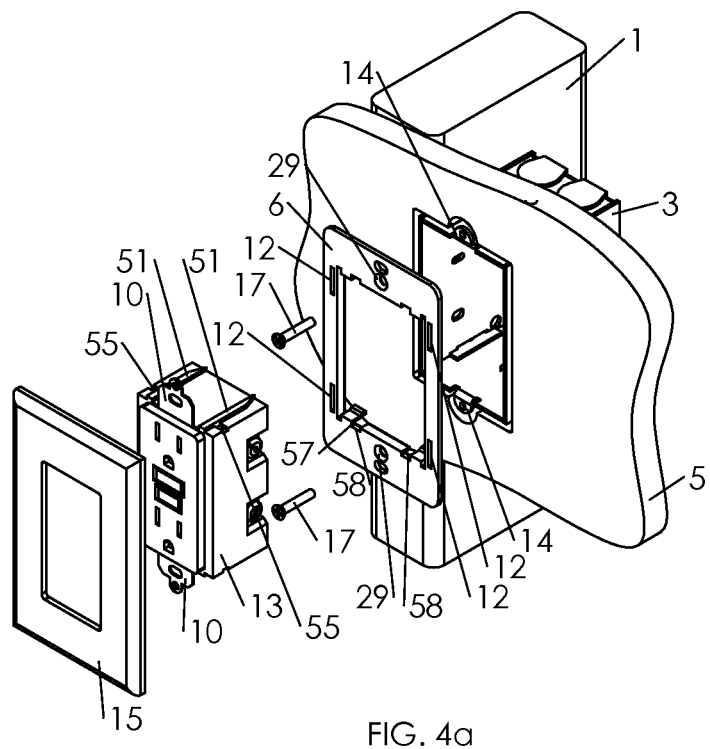
Figure 4B:
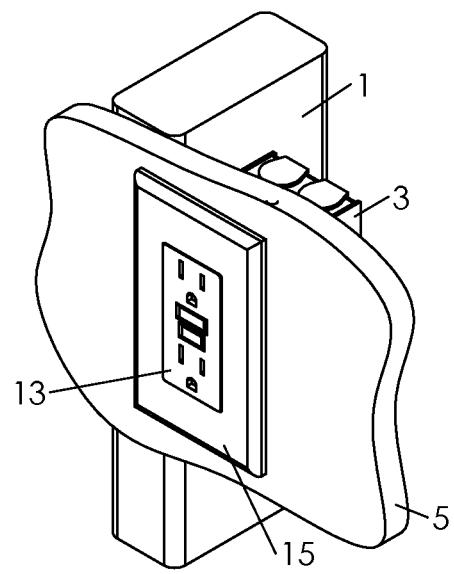
Figure 5A:
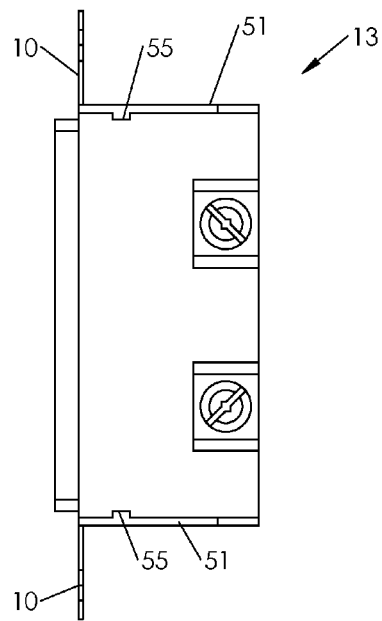
Figure 5B:
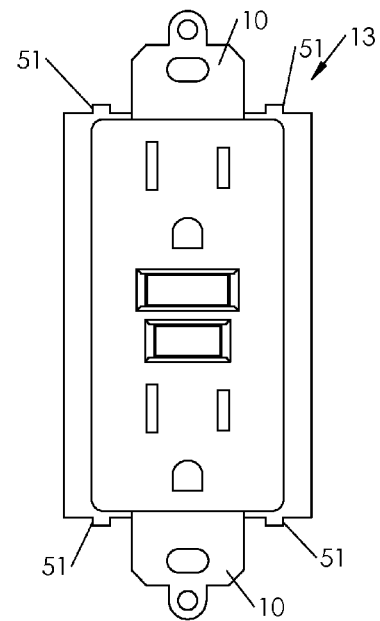
Figure 5C:
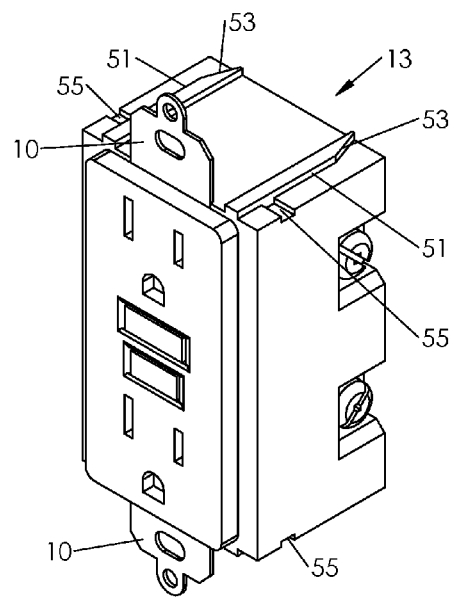
Figure 5D:
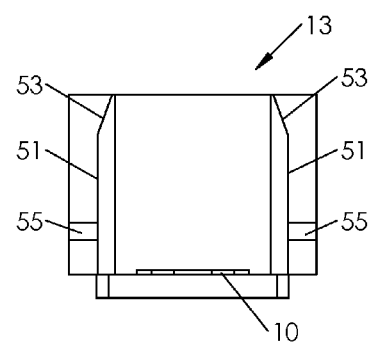
Figure 10A:
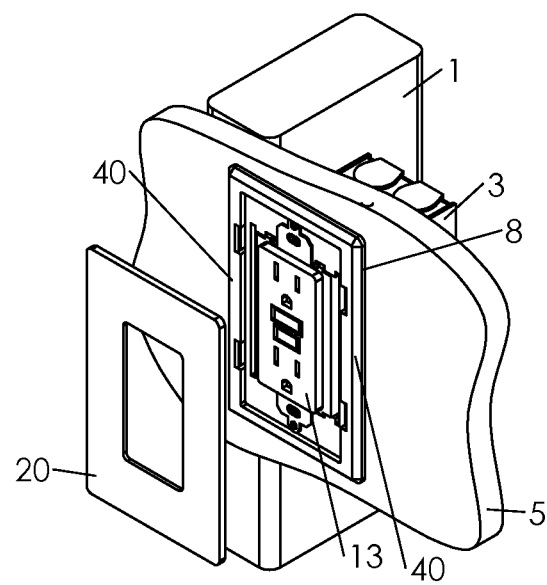
FIGS. 10a-10b are perspective views of a modification of the embodiment shown in FIGS. 4a-4b.
Figure 10B:
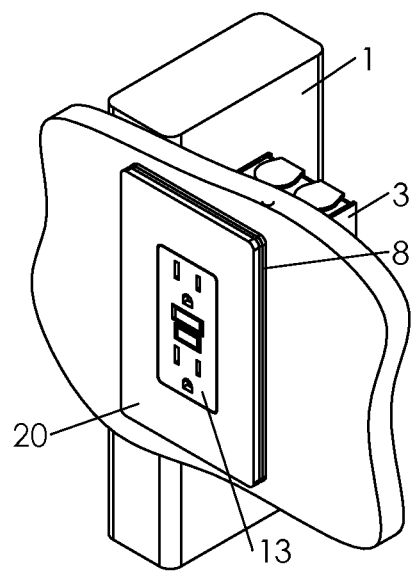

FIGS. 10a-10b illustrates a variation to the single gang snap-in configuration of the flush flange assembly shown in FIGS. 4a-4b. Flange 8 corresponds to flange 6 shown previously. Flange 8 has proud perimeter embossment 40, giving additional strength to the part. The embossed perimeter is visible after the matching cover plate 20 is installed. Flange 8 is shown in more detail in FIGS. 10c-10d.

Figure 11F:
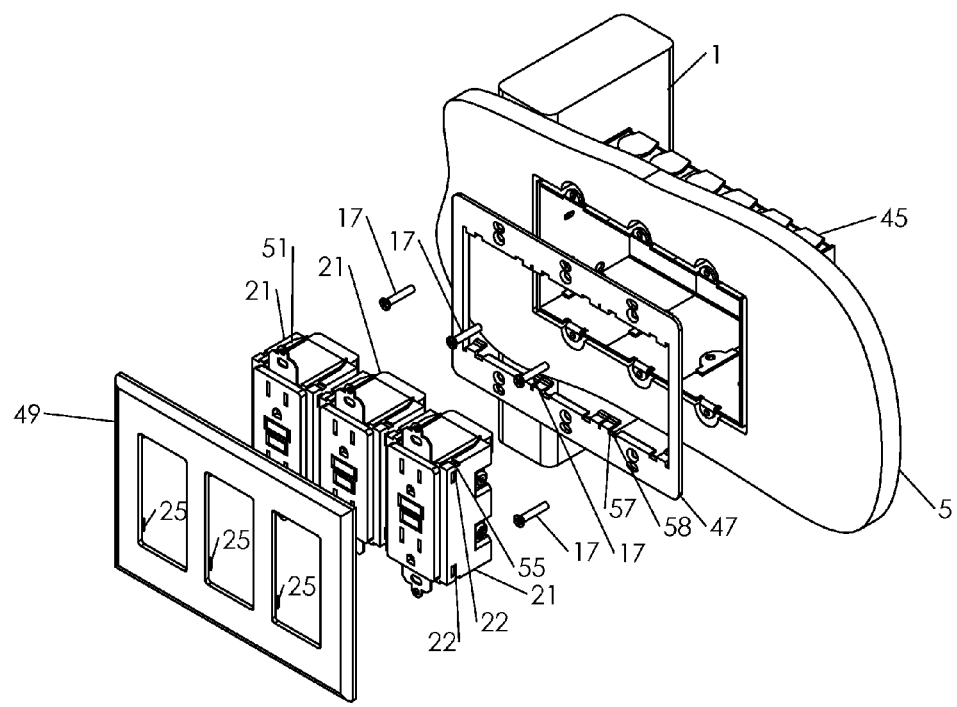
FIGS. 11f-11g are exploded and assembled perspective views, respectively, of a three gang installation of the embodiment shown in FIGS. 11a-11b.
Figure 11G:
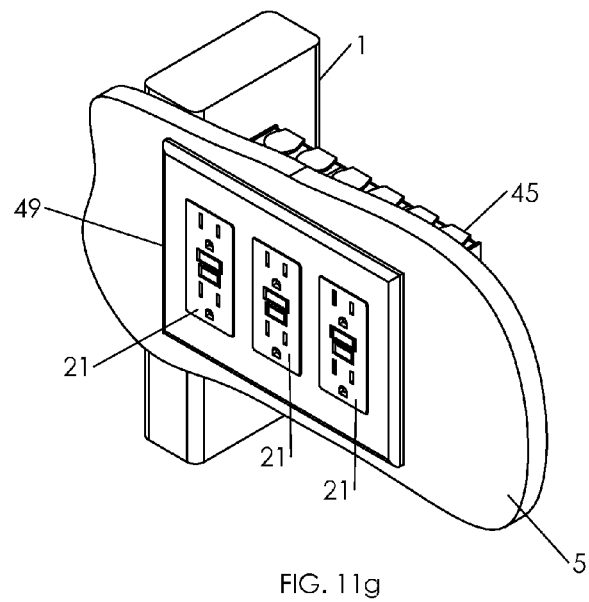

FIGS. 11a-11e illustrate device 21, in an alternate embodiment of the snap-in device shown previously, mounted via fasteners 17 to conventional electrical box 3. Recesses 22 on either side in either side of device 21 receive resilient retainers 25 on cover plate 23, holding it in place. This arrangement permits direct mounting of a cover plate directly to a device without need for screws or attachment to the flange. A multigang arrangement is shown in FIGS. 11f-11g. Multigang cover plate 49 include resilient retainers 25 that snap-on to recesses 22 on the sides of devices 21. Devices 21 snap-in to flange 47. Horizontal centering surfaces 57 of flange 47 index devices 21 to provide ideal spacing and easy installation of snap-on cover plate 49.

Figure 12A:
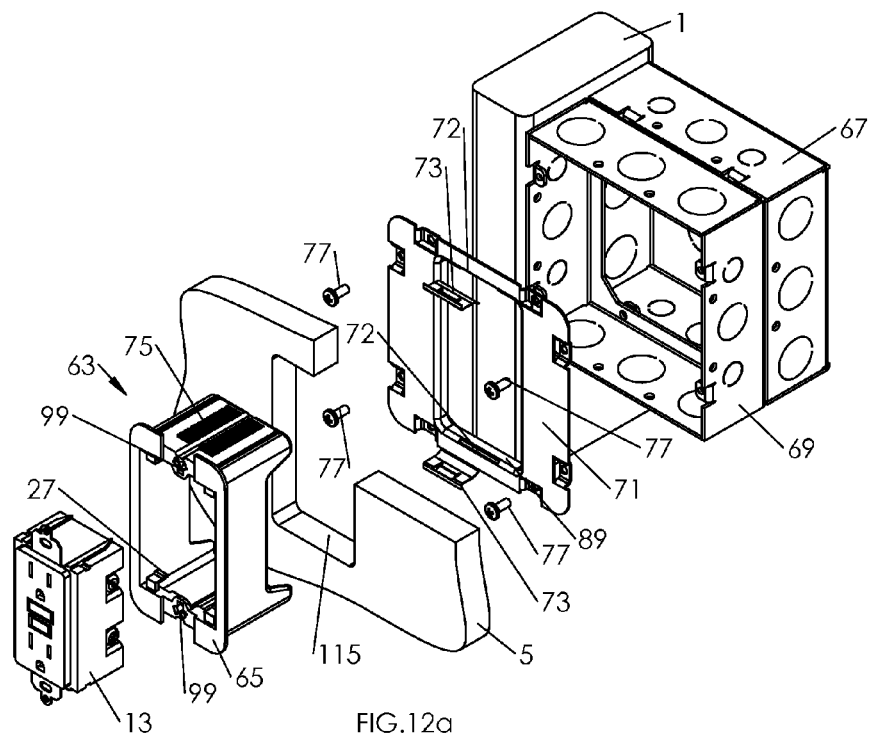
FIGS. 12a and 12b are exploded and assembled perspective views, respectively, of an alternative embodiment.
Figure 12B:
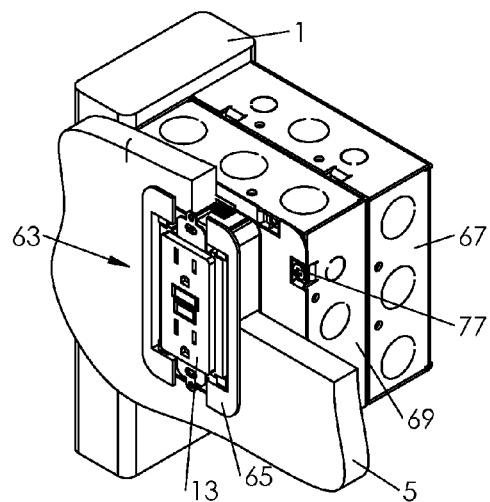

FIGS. 12a-12b illustrate an alternative assembly, similar in some respects to that disclosed in co-pending application Ser. No. 13/745,034 of the current inventors, identified above. Sleeve 63, having barbed teeth 75 along an extent of its outer surface, can be mounted in flange collar 71. As illustrated, flange collar 71 is attached by screws 77 to electrical box extension 69 mounted on electrical box 67. The box structure is mounted on stud 1. Sprung retainers 73 extend from on the top and bottom of the inner periphery of flange collar 71 to engage teeth 75 on the top and bottom outer surfaces of sleeve 63. Sleeve 63 has internal ratchet threads 99 to receive mounting screws for accommodating installation of a conventional device.

Snap-in device 13 snaps into retainers 27 of sleeve 63, illustrated in FIGS. 12a-12b. Wall substrate, illustrated as drywall, hole 115 provides access to the roughed in box assembly 67 and 69, and flange collar 71. Cutting of the drywall is achieved by running a rotating drywall cutting tool with a guide tip tool along internal perimeter flange 89 of flange collar 71. Retainers 73, which may be made of spring steel, can be inserted through silts 72 on flange collar 71. The retainers are sufficiently recessed beyond internal perimeter flange 89 to prevent the cutting tool from contacting them. Flange collar 71 can be mounted 90 degrees to the shown orientation if a horizontally oriented device is desired.

As shown in FIGS. 13a-13e, a single gang sleeve 63 includes perimeter wall 103 that completely encloses the device and electrical connections of the installations regardless of the thickness of the wall substrate. For example, the wall substrate may include drywall with additional cladding, such as tile. Such enclosure meets electrical code requirements for line voltage installations. Flange 65 serves to apply pressure to the drywall on the front of the installation to effectively sandwich the drywall, resulting in a well secured installation. Ribs 97 serve to ensure that sleeve 63 remains centered vertically in flange collar 71. Removal slots 113 allow a removal tool such as a screwdriver to be inserted in order to flex sprung retainer 73 of flange collar 71 outwardly to disengage it from teeth 75, thereby permitting removal of sleeve 63 from flange collar 71. Horizontal centering surfaces 57 and vertical centering surfaces 58, serve to center snap-in device 13. Internal ratchet threads 99, have biased arms with a single thread which flex out of the way as an appropriately sized conventional threaded fastener is pushed in to full depth and tightened with a screwdriver. The bias secures the fastener until unscrewed. This internal ratchet thread feature can be used in conventional electrical boxes.

Figure 14A:
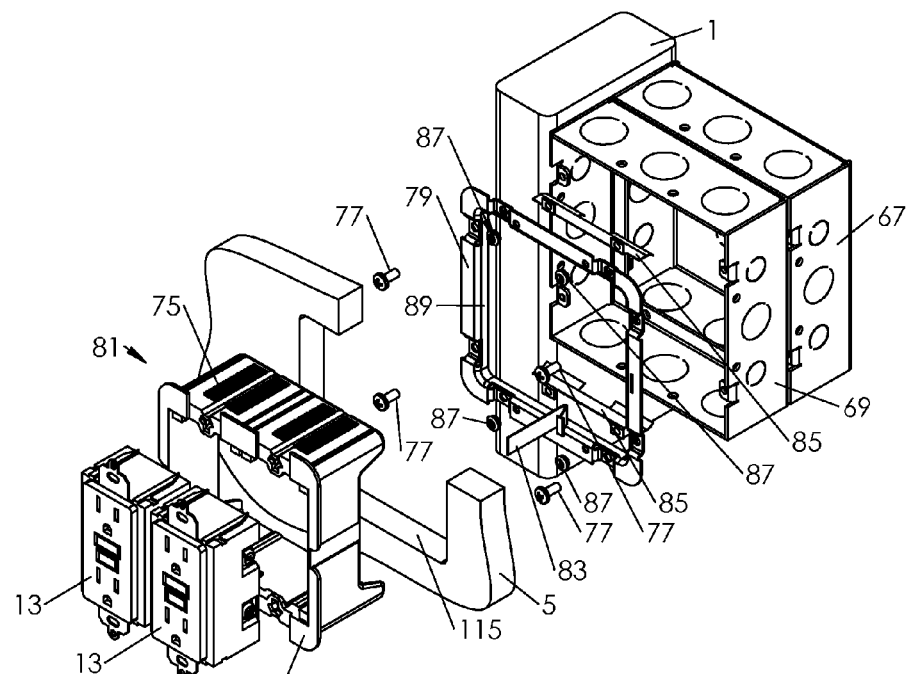
FIGS. 14a-14b are exploded and assembled perspective views of a two gang installation of the embodiment shown in FIGS. 12a-12b.
Figure 14B:
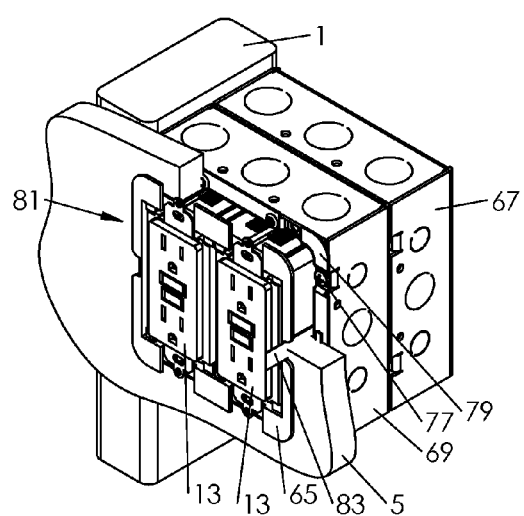
Figure 15A:
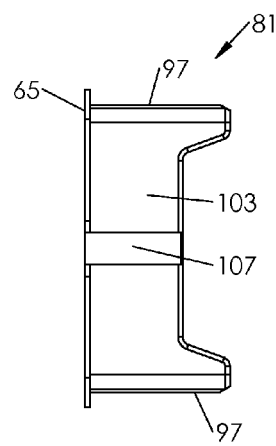
FIGS. 15a-15d are various detail views of the sleeve of FIGS. 14a-14b.
Figure 15B:
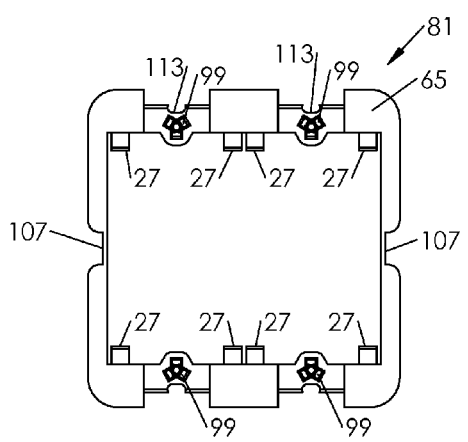
Figure 15C:
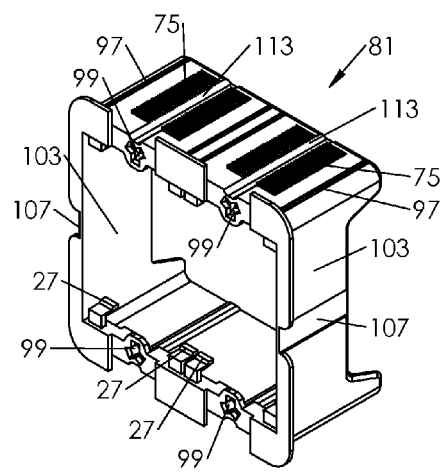
Figure 15D:
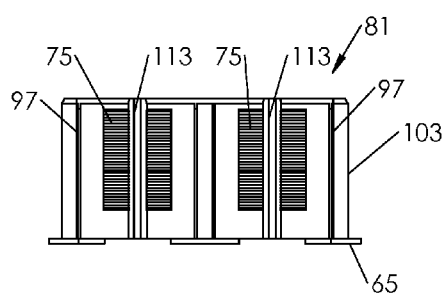
Figure 16A:
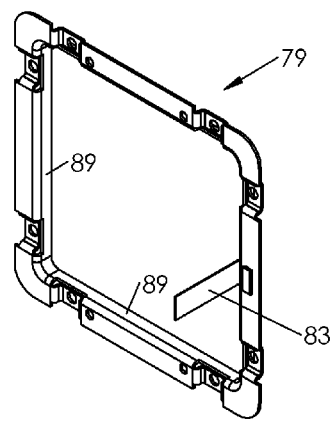
FIGS. 16a-16e are various detail views of the flange collar of FIGS. 14a-14b.
Figure 16B:
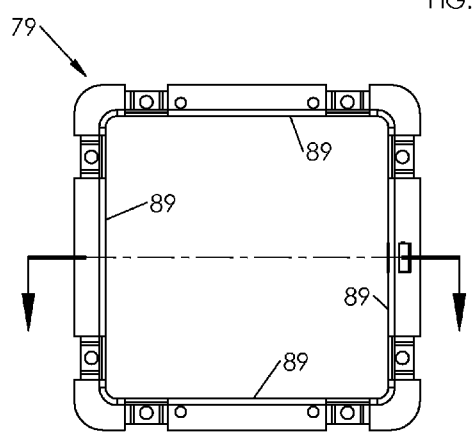
Figure 16C:
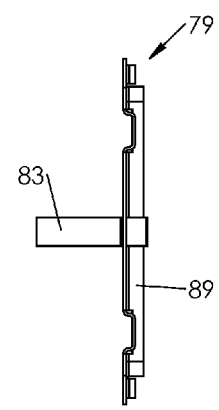
Figure 16D:
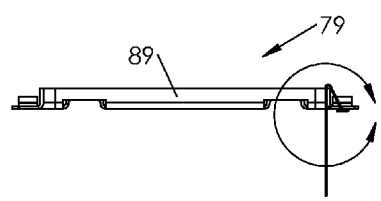
Figure 16E:
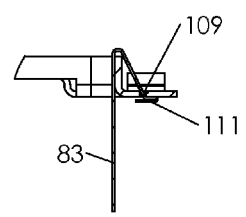

FIGS. 14a-14b illustrate a two gang embodiment of the assembly seen in FIGS. 13a-13e. Two gang collar 79 is screwed via fasteners 77 to electrical box extension 69 mounted on electrical box 67 and fixed to stud 1. Flange collar 79 has internal perimeter flange 89 that serves to provide a cutting jig for drywall hole 115. Sprung retainers 85 are fixed with rivets 87 to collar 79. Collar 79 has pull 83 made of flexible webbing. Collar 79 is oriented with pull 83 on the non-stud side of box extension 69. Pull 83 allows the installer to provide a counterforce on the unsupported side of the box when inserting sleeve 81 through hole 115 into collar 79 effectively sandwiching drywall 5 between collar 79 and flange 67 of sleeve 81. Sprung retainers 85 of collar 79 retain teeth 75 of collar 79. Pull 83 can be cut off after use or pushed back into the assembly or left hanging and concealed by a cover plate. Devices 13 snap into sleeve 81. Collar 79 can be mounted 90 degrees to the shown orientation if horizontally oriented devices are desired.

FIGS. 15a-15d illustrate two gang sleeve 81 with corresponding features to the one gang version shown in FIGS. 13a-13d. Recess 107 provides a space for pull 83 to pass though as sleeve 81 is inserted. FIGS. 16a-16e illustrate the two gang collar 79. Pull 83 can hang out of the way of the cutting tool to permit cutting around interior perimeter flange 89 without obstruction. Pull 83 has sewn hem 111 that acts as a stop as it passes through hole 109 in collar 79.

Figure 17A:
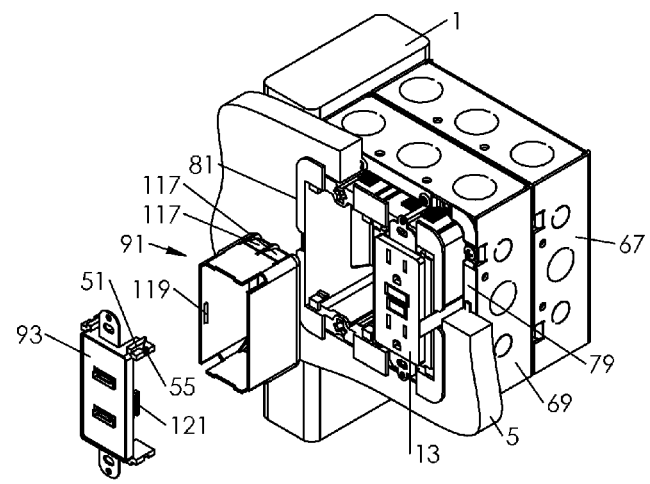
FIG. 17a is an exploded perspective view of a line voltage device and low voltage device installation.
Figure 17B:
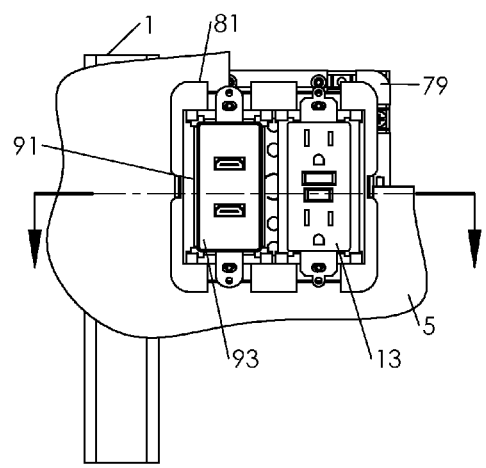
Figure 17C:
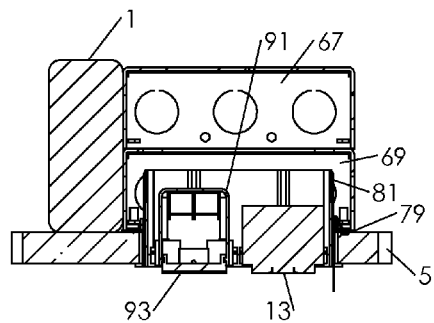
FIG. 17c is a section view taken from FIG. 17b.
Figures 18A, 18B, 18C, 18D:
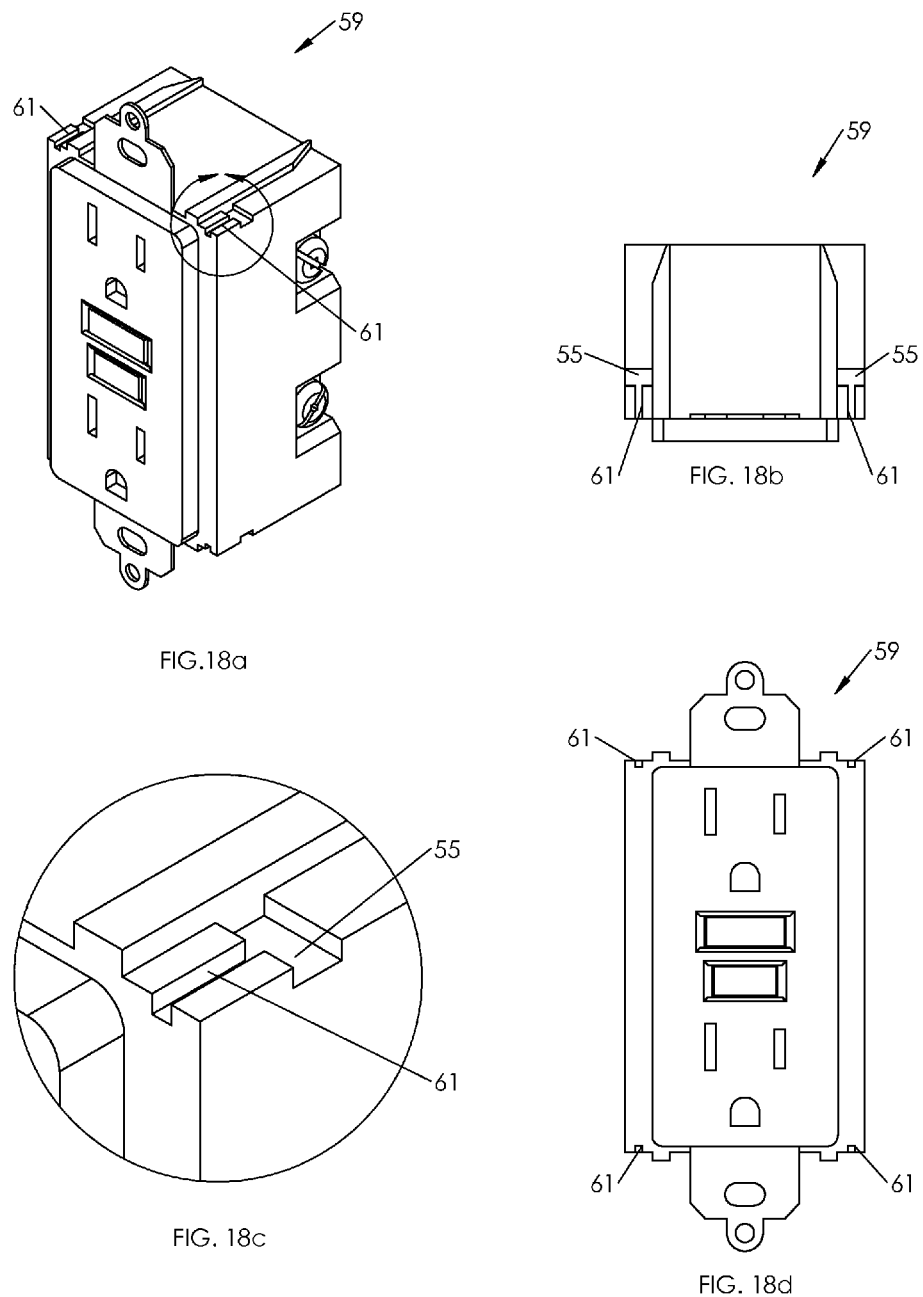
FIGS. 18a-18d are various detail views of the snap-in electrical device of FIGS. 17a-17c.
Figure 19A:
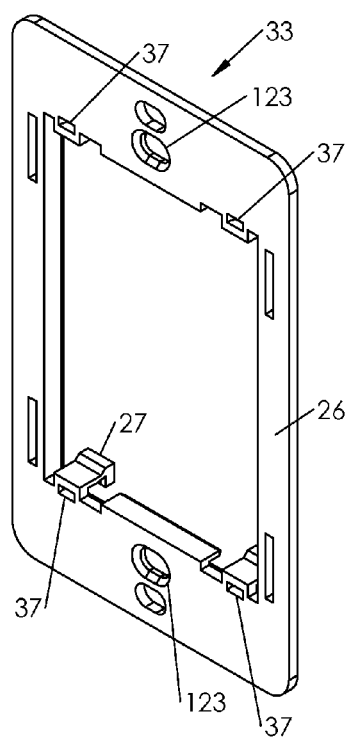
FIGS. 19a-19e are various detail views of the flange collar of FIGS. 17a-17c.
Figure 19B:
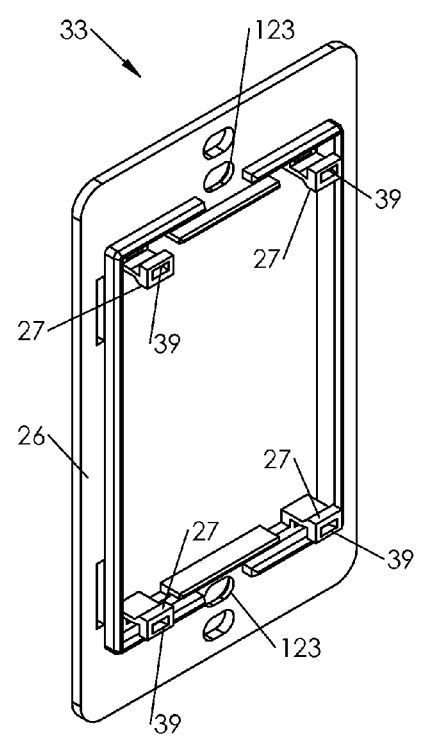
Figure 19C:
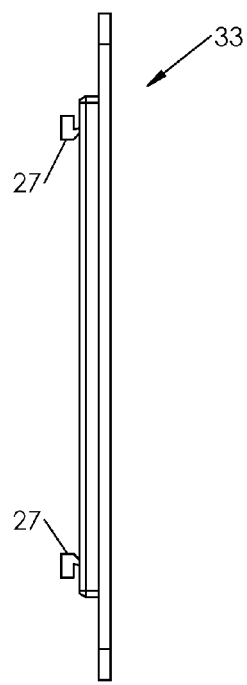
Figure 19D:
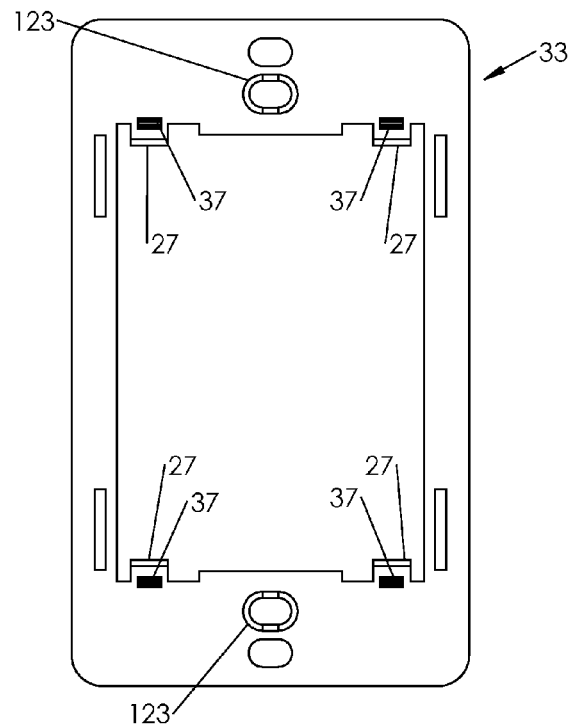
Figure 19E:
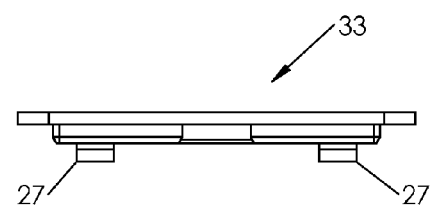

FIGS. 17a-17c illustrate an installation that accommodates mounting of low voltage device 93 and line voltage device 13 in the same sleeve 81, collar 79, and box assembly. Low voltage device 93 includes isolation box 91 that ensures that the differing voltage wire connections, not shown, are isolated. isolation box 91 comprises resilient wire strain relief ports 117 on the top and bottom. Side recesses 119 receive barbed retainers 121 of low voltage device 93. This embodiment alleviates the need to install a dividing plate between differing voltage devices. Low voltage device 93 has snap-in features similar to those on the device in FIGS. 5a-5d, such as ribs 51 and recesses 55. Although this embodiment is shown with novel sleeve 81 and collar 79, isolation box 91 can be used on a suitable low voltage device in a conventional multigang electrical box installation.

Electrical device 59 of FIGS. 18a-18d is provided with an alternate means of removal from retainers 27 on flush flange 6 or sleeve 81. Slots 61 on device 59 can receive a slender tool, such as a screw driver or the like, to flex retainers 27 outward and disengage them from recesses 55 on device 59.

FIGS. 19a-19e illustrate a modification of flange 6 of FIGS. 3a-3e. Flange 33 comprises an alternate device removal feature. Four removal access holes 37 on flange 33 provide access to hole 39 on the outboard side of sprung retainer 27. A screwdriver or the like can be inserted through hole 37 to hole 39 and used to pry sprung retainer from device recesses 55, thereby allowing device 13 to be removed. Countersunk slots 123 allow flush flange 33 to be mounted and adjusted angularly on the box.

Figure 20A:
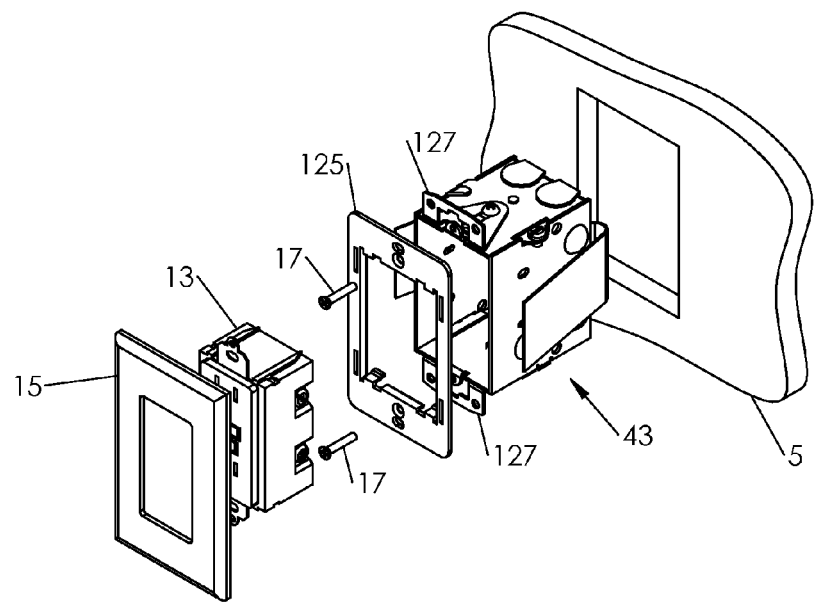
FIGS. 20a-20b are exploded and assembled perspective views, respectively, of the embodiment of FIG. 1 employable in an existing wall.
Figure 20B:
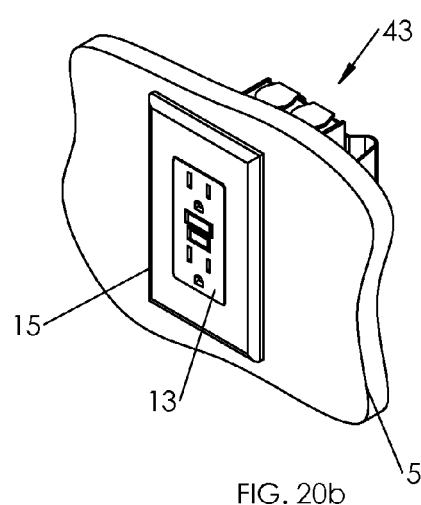

FIGS. 20a-20b illustrate application of the concepts of this disclosure to installation of the embodiment of FIGS. 4a-4e in a pre-existing wall. Conventional rework box 43 can be coupled to flange 125 to facilitate snap-in of the device 13 and cover plate 15. Perimeter ribs 35 on the top and bottom of the flange 125 have been shortened to accommodate rework box ears 127 on the front side of drywall 5.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, while the electrical device has been exemplified with protruding ribs that can mate with cutouts in the flange to center the device, the instead may contain troughs in its housing to mate with protrusions in the flange. It should be understood that the term "drywall" as used throughout the disclosure is representative of any wall substrate. Similarly, it should be understood that the concepts disclosed herein are applicable to other electrical devices, such as keypads, speakers, display devices, and the like and to supporting other elements or appliance within a building surface.

What is claimed is:

1. An assembly comprising:
    a flange configured for coupling to a structure interior to a wall substrate, the flange having a periphery defining an opening in a wall substrate and a flange surface that is flush with an inner surface of the wall substrate;
    a removable sleeve engageable with the flange and the wall substrate to secure tight contact between the wall substrate and the interior structure irrespective of the thickness of the wall substrate; and
    wherein the sleeve comprises an inner longitudinal surface having retainers extending therefrom.

2. An assembly as recited in claim 1, wherein the sleeve comprises an outer longitudinal surface mountable to the flange through the opening in the wall substrate and a plurality of teeth spaced along an extent of the outer surface; and
    the flange comprises a plurality of retainers extending from the periphery, the retainers configured to engage the teeth of the sleeve.

3. An assembly as recited in claim 1, wherein the electrical device comprises a plurality of recesses configured to engage, respectively, the retainers extending from the inner longitudinal surface of the sleeve.

4. An assembly as recited in claim 1, wherein the flange is configured as a template guide for cutting the wall substrate opening.

5. An assembly, comprising:
    a flange configured for coupling to a structure interior to a wall substrate, the flange having a periphery defining an opening in a wall substrate and a flange surface that is flush with an inner surface of the wall substrate;
    a removable sleeve engageable with the flange and the wall substrate to secure tight contact between the wall substrate and the interior structure irrespective of the thickness of the wall substrate; and
    an electrical device insertable in the sleeve through an opening in the wall substrate;
    wherein the sleeve comprises an inner longitudinal surface having retainers extending therefrom.

6. An electrical device, operable within a building wall, the device comprising:
    a housing; and
    an electrical component interior of the housing;
    wherein:
    the housing is configured for tightly engaging a flange of a wall structural element;
    the housing comprises a plurality of recesses configured to engage, respectively, retainers extending from the flange; and
    wherein the plurality of recesses are interior of an outer surface of the housing and the housing further comprises a plurality of slots extending, respectively, from the outer surface to the plurality of recesses.

7. An electrical device as recited in claim 6, wherein the housing comprises a plurality of ribs configured to mate, respectively, with cutout portions of the flange.

\* \* \* \* \*